United States Patent
Ding et al.

(10) Patent No.: US 9,712,083 B2
(45) Date of Patent: Jul. 18, 2017

(54) METHOD AND DEVICE FOR SWITCHING OPERATION MODE OF A FIVE-LEVEL INVERTER

(71) Applicant: Sungrow Power Supply Co., Ltd., Hefei, Anhui (CN)

(72) Inventors: Jie Ding, Anhui (CN); Haiyan Zou, Anhui (CN); Lei Tao, Anhui (CN); Taotao Xu, Anhui (CN); Cheng Zhang, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 63 days.

(21) Appl. No.: 14/938,228

(22) Filed: Nov. 11, 2015

(65) Prior Publication Data

US 2016/0181946 A1 Jun. 23, 2016

(30) Foreign Application Priority Data

Dec. 18, 2014 (CN) .......................... 2014 1 0795320

(51) Int. Cl.
*H02M 7/483* (2007.01)
*H02M 7/487* (2007.01)
(Continued)

(52) U.S. Cl.
CPC ............ *H02M 7/483* (2013.01); *H02M 1/32* (2013.01); *H02M 7/487* (2013.01); *H02M 3/00* (2013.01);
(Continued)

(58) Field of Classification Search
CPC ........ H02M 1/32; H02M 7/483; H02M 7/487; H02M 7/49
(Continued)

(56) References Cited

U.S. PATENT DOCUMENTS 8,228,695 B2 * 7/2012 Roesner ................ H02M 7/487
363/131
8,750,005 B2 6/2014 Fujii et al.
(Continued)

FOREIGN PATENT DOCUMENTS

CN 103023363 A 4/2013
CN 103081333 A 5/2013
(Continued)

OTHER PUBLICATIONS

Japanese 1st Office Action corresponding to Application No. 2015-226899; Issued: Dec. 20, 2016, with English brief summary.
(Continued)

*Primary Examiner* — Jeffrey Sterrett
(74) *Attorney, Agent, or Firm* — Cantor Colburn LLP

(57) ABSTRACT

A method and device for switching an operation mode of a five-level inverter are provided. The method includes: determining a first three-level operation mode as a three-level operation mode to be switched to from a five-level operation mode in a case that a PV input voltage is higher than a bridge line-line voltage command value; switching, after the operation mode is switched to the first three-level operation mode, the operation mode from the first three-level operation mode to a second three-level operation mode, in a case that a junction temperature of a switching device operating in the first three-level operation mode exceeds a first preset value; and switching the operation mode from the second three-level operation mode to the first three-level operation mode in a case that the junction temperature of a switching device operating in the second three-level operation mode exceeds a second preset value.

10 Claims, 4 Drawing Sheets

(51) Int. Cl.
*H02M 3/00* (2006.01)
*H02M 1/32* (2007.01)

(52) U.S. Cl.
CPC ........ *H02M 2001/327* (2013.01); *Y02E 10/56* (2013.01)

(58) Field of Classification Search
USPC .............................. 363/43, 55, 56.01, 95, 97
See application file for complete search history.

(56) References Cited

U.S. PATENT DOCUMENTS

| | | | |
|---|---|---|---|
| 9,001,544 B2 | 4/2015 | Itoh et al. | |
| 2011/0116293 A1 | 5/2011 | Tabata et al. | |
| 2013/0163301 A1 | 6/2013 | Fujii et al. | |
| 2014/0139159 A1* | 5/2014 | Sato | H02M 1/32 318/400.22 |
| 2015/0349521 A1* | 12/2015 | Liu | G01R 31/025 361/93.1 |
| 2016/0118909 A1* | 4/2016 | Cheng | H02M 7/44 363/71 |
| 2016/0118972 A1* | 4/2016 | Li | H02M 7/5395 327/175 |
| 2016/0181945 A1* | 6/2016 | Ding | H02M 1/00 307/82 |
| 2016/0181946 A1* | 6/2016 | Ding | H02M 7/487 363/56.01 |
| 2016/0190811 A1* | 6/2016 | Pan | H02M 7/44 307/82 |
| 2016/0268925 A1* | 9/2016 | Hu | H02M 7/487 |

FOREIGN PATENT DOCUMENTS

| | | |
|---|---|---|
| EP | 2590312 A1 | 5/2013 |
| JP | 2003153588 A | 5/2003 |
| JP | 2011109789 A | 6/2011 |
| JP | 2014050134 A | 3/2014 |
| WO | 2012025978 A1 | 3/2012 |
| WO | 2013166870 A1 | 11/2013 |

OTHER PUBLICATIONS

Chinese First Office Action corresponding to Patent No. 201410795320.0; Issue Date: Jul. 1, 2016, with English summary.
Extended European Search Report corresponding to Application No. 15193952.7-1809/3035509; Issued: Jul. 4, 2016.
The-minh Phan et al., "PWM for Active Thermal Protection in Three Level Neutral Point Clamped Inverters" 2013 IEEE ECCE Asia Downunder (ECCE Asia) Conference Paper, Jun. 3, 2013, pp. 906-911.

* cited by examiner

METHOD AND DEVICE FOR SWITCHING OPERATION MODE OF A FIVE-LEVEL INVERTER

CROSS REFERENCE OF RELATED APPLICATION

The present application claims the priority to Chinese Patent Application No. 201410795320.0, titled "METHOD AND DEVICE FOR SWITCHING OPERATION MODE OF A FIVE-LEVEL INVERTER", filed on Dec. 18, 2014 with the State Intellectual Property Office of the PRC, which is incorporated herein by reference in its entirety.

FIELD

The present disclosure relates to the technical field of photovoltaic power generation, and in particular to a method for switching an operation mode of a five-level inverter and a device for switching an operation mode of a five-level inverter.

BACKGROUND

As shown in FIG. 1, a direct current side of a five-level inverter 10 is connected to a photovoltaic array 20 and configured to receive a direct current PV input voltage. An output voltage from a grid side of the five-level inverter 10 is filtered by a filter 30, step up by a transformer 40 and then transmitted to a power grid. The PV input voltage is applied across a positive electrode of a capacitor C1 and a negative electrode of a capacitor C2, voltage applied across C1 is V1Pos and voltage applied across C2 is V1Neg. And the PV input voltage is step up by two Boost circuits, then is applied across a positive electrode of a bus capacitor C3 and a negative electrode of a bus capacitor C4, and voltage applied across C3 is V2Pos and voltage applied across C4 is V2Neg. In different combinations of switching states of switching devices, the five-level inverter 10 alternately outputs levels +V1Pos (i.e., +1), −V1Neg (i.e., −1), +V2Pos (i.e., +2), −V2Neg (i.e., −2) and a zero level corresponding to the middle point of the DC bus.

In a case that the PV input voltage is higher than a bridge line-line voltage command value of the five-level inverter 10 required when the five-level inverter 10 is connected to a power grid, the operation mode of the five-level inverter 10 is switched automatically from a five-level operation mode to a three-level operation mode. However, since in this case the bus voltage is high and the output voltage level of the grid side inverter is reduced, power loss of switching devices S1Pos, S1Neg and S0 increases significantly, and a junction temperature of the switching devices is higher, over-temperature protection for the switching devices may be triggered and service lives of the switching devices are reduced greatly.

SUMMARY

In view of above, a method for switching an operation mode of a five-level inverter and device for switching an operation mode of a five-level inverter are provided according to the present disclosure, to reduce a junction temperature of the switching devices still operating after the operation mode of the five-level inverter is switched from a five-level operation mode to a three-level operation mode, thereby preventing shutting down of the five-level inverter due to triggering of over-temperature protection for the switching devices and prolonging service lives of the switching devices.

A method for switching an operation mode of a five-level inverter is provided, which includes:

determining a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, where the five-level inverter has two three-level operation modes;

switching, after the operation mode of the five-level inverter is switched to the first three-level operation mode, the operation mode of the five-level inverter from the first three-level operation mode to a second three-level operation mode in a case that a junction temperature of a switching device operating in the first three-level operation mode exceeds a first preset value; and switching the operation mode of the five-level inverter from the second three-level operation mode to the first three-level operation mode in a case that the junction temperature of a switching device operating in the second three-level operation mode exceeds a second preset value.

Specifically, the first three-level operation mode may refer to an operation mode in which a first switching device, a second switching device and a third switching device operate alternately, and the second three-level operation mode may refer to an operation mode in which a fourth switching device, a fifth switching device and the third switching device operate alternately; and the five-level inverter may alternately output five levels +1, −1, +2, −2 and 0 in different combinations of switching states of the switching devices, where the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, the junction temperature of the switching device operating in the first three-level operation mode exceeding the first preset value may indicate that a current value of at least one of the following variants: the junction temperature of the first switching device or the second switching device, a substrate temperature of the first switching device or the second switching device, a radiator temperature of the first switching device or the second switching device, an $I^2t$ calculation value of the first switching device or the second switching device and an operation duration of the first switching device or the second switching device is greater than a threshold of the at least one of the variants; and the junction temperature of the switching device operating in the second three-level operation mode exceeding the second preset value may indicate that a current value of at least one of the following variants: the junction temperature of the fourth switching device or the fifth switching device, the substrate temperature of the fourth switching device or the fifth switching device, the radiator temperature of the fourth switching device or the fifth switching device, the $I^2t$ calculation value of the fourth switching device or the fifth switching device and the operation duration of the fourth switching device or the fifth switching device is greater than a threshold of the at least one of the variants.

A method for switching an operation mode of a five-level inverter is provided, which includes:

determining a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, where the five-level inverter has two three-level operation modes;

switching, after the operation mode of the five-level inverter is switched to the first three-level operation mode, the operation mode of the five-level inverter from the first three-level operation mode to a second three-level operation mode in a case that a junction temperature of a switching device operating in a positive half-period of an output voltage of each single-phase bridge and in the first three-level operation mode exceeds a third preset value, and switching the operation mode of the five-level inverter from the second three-level operation mode to the first three-level operation mode in a case that the junction temperature of a switching device operating in the positive half-period of the output voltage of each single-phase bridge and in the second three-level operation mode exceeds a fourth preset value; and switching the operation mode of the five-level inverter from the first three-level operation mode to the second three-level operation mode in a case that the junction temperature of a switching device operating in a negative half-period of the output voltage of each single-phase bridge and in the first three-level operation mode exceeds a fifth preset value, and switching the operation mode of the five-level inverter from the second three-level operation mode to the first three-level operation mode in a case that the junction temperature of a switching device operating in the negative half-period of the output voltage of each single-phase bridge and in the second three-level operation mode exceeds a sixth preset value.

Specifically, the first three-level operation mode may refer to an operation mode in which a first switching device, a second switching device and a third switching device operate alternately, and the second three-level operation mode may refer to an operation mode in which a fourth switching device, a fifth switching device and the third switching device operate alternately; and the five-level inverter may alternately output five levels +1, −1, +2, −2 and 0 in different combinations of switching states of the switching devices, where the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

Specifically, the junction temperature of the switching device operating in the positive half-period of the output voltage of each single-phase bridge and in the first three-level operation mode exceeding the third preset value may indicate that a current value of at least one of the following variants: the junction temperature of the first switching device, a substrate temperature of the first switching device, a radiator temperature of the first switching device, an $I^2t$ calculation value of the first switching device and an operation duration of the first switching device is greater than a threshold of the at least one of the variants;

the junction temperature of the switching device operating in the positive half-period of the output voltage of each single-phase bridge and in the second three-level operation mode exceeding the fourth preset value may indicate that a current value of at least one of the following variants: the junction temperature of the second switching device, the substrate temperature of the second switching device, the radiator temperature of the second switching device, the $I^2t$ calculation value of the second switching device and the operation duration of the second switching device is greater than a threshold of the at least one of the variants;

the junction temperature of the switching device operating in the negative half-period of the output voltage of each single-phase bridge and in the first three-level operation mode exceeding the fifth prevent value may indicate that a current value of at least one of the following variants: the junction temperature of the fourth switching device, the substrate temperature of the fourth switching device, the radiator temperature of the fourth switching device, the $I^2t$ calculation value of the fourth switching device and the operation duration of the fourth switching device is greater than a threshold of the at least one of the variants; and the junction temperature of the switching device operating in the negative half-period of the output voltage of each single-phase bridge and in the second three-level operation mode exceeding the sixth preset value may indicate that a current value of at least one of the following variants: the junction temperature of the fifth switching device, the substrate temperature of the fifth switching device, the radiator temperature of the fifth switching device, the $I^2t$ calculation value of the fifth switching device and the operation duration of the fifth switching device is greater than a threshold of the at least one of the variants.

A device for switching an operation mode of a five-level inverter is provided, which includes:

a first processing unit configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, where the five-level inverter has two three-level operation modes;

a second processing unit configured to switch, after the operation mode of the five-level inverter is switched to the first three-level operation mode, the operation mode of the five-level inverter from the first three-level operation mode to the second three-level operation mode in a case that a junction temperature of the switching devices operating in the first three-level operation mode exceeds a first preset value; and a third processing unit configured to switch the operation mode of the five-level inverter from the second three-level operation mode to the first three-level operation mode in a case that the junction temperature of a switching device operating in the second three-level operation mode exceeds a second preset value.

Specifically, the first three-level operation mode may refer to an operation mode in which a first switching device, a second switching device and a third switching device operate alternately, and the second three-level operation mode may refer to an operation mode in which a fourth switching device, a fifth switching device and the third switching device operate alternately; and the five-level inverter may alternately output five levels +1, −1, +2, −2 and 0 in different combinations of switching states of the switching devices, where the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

A device for switching an operation mode of a five-level inverter is provided, which includes:

a first processing unit configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, where the five-level inverter has two three-level operation modes;

a second processing unit configured to switch, after the operation mode of the five-level inverter is switched to the first three-level operation mode, the operation mode of the five-level inverter from the first three-level operation mode to a second three-level operation mode in a case that a junction temperature of a switching device operating in a positive half-period of an output voltage of each single-phase bridge and in the first three-level operation mode exceeds a third preset value;

a third processing unit configured to switch the operation mode of the five-level inverter from the second three-level operation mode to the first three-level operation mode in a case that the junction temperature of a switching device operating in the positive half-period of the output voltage of each single-phase bridge and in the second three-level operation mode exceeds a fourth preset value;

a fourth processing unit configured to switch the operation mode of the five-level inverter from the first three-level operation mode to the second three-level operation mode in a case that the junction temperature of a switching device operating in a negative half-period of the output voltage of each single-phase bridge and in the first three-level operation mode exceeds a fifth preset value; and a fifth processing unit configured to switch the operation mode of the five-level inverter from the second three-level operation mode to the first three-level operation mode in a case that the junction temperature of a switching device operating in the negative half-period of the output voltage of each single-phase bridge and in the second three-level operation mode exceeds a sixth preset value Specifically, the first three-level operation mode may refer to an operation mode in which a first switching device, a second switching device and a third switching device operate alternately, and the second three-level operation mode may refer to an operation mode in which a fourth switching device, a fifth switching device and the third switching device operate alternately; and the five-level inverter may alternately output five levels +1, −1, +2, −2 and 0 in different combinations of switching states of the switching devices, where the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

According to the technical solutions above, in the present disclosure, in a case that the PV input voltage of the five-level inverter is higher than the bridge line-line voltage command value of the five-level inverter required when the five-level inverter is connected to the power grid, the operation mode of the five-level inverter is controlled to be switched between the two three-level operation modes, and the switching devices corresponding to the first operation mode and the switching devices corresponding to the second operation mode operate alternately, such that power loss is shared by two groups of switching devices, thereby reducing a maximum junction temperature of each group of switching devices, reducing a heat-dissipation cost of the switching devices, prolonging service lives of the switching devices and improving the operation reliability of the five-level inverter.

BRIEF DESCRIPTION OF THE DRAWINGS

In order to illustrate technical solutions in embodiments of the present disclosure or the conventional technology more clearly, hereinafter drawings to be used in the description of the embodiments or the conventional technology are introduced simply. Apparently, the drawings described below only describe the embodiments of the present disclosure. For those skilled in the art, other drawings may be obtained based on the provided drawings without any creative work.

DETAILED DESCRIPTION OF THE EMBODIMENTS

Hereinafter technical solutions of embodiments of the present disclosure are described clearly and completely in conjunction with the drawings of the embodiments of the present disclosure. Apparently, the described embodiments are only some rather than all of the embodiments of the present disclosure. Any other embodiments obtained based on the embodiments of the present disclosure by those skilled in the art without any creative work fall within the protection scope of the present disclosure.

Figure 2:
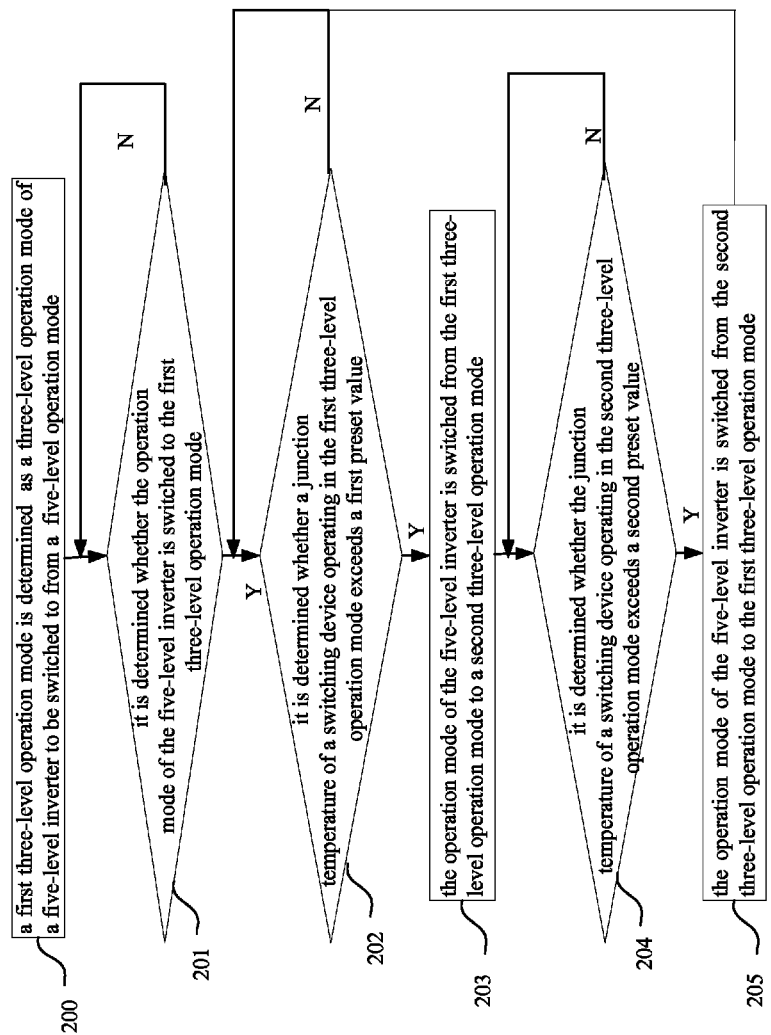
FIG. 2 is a flowchart of a method for switching an operation mode of a five-level inverter according to an embodiment of the present disclosure.

Referring to FIG. 2, a method for switching an operation mode of a five-level inverter is disclosed according to an embodiment of the present disclosure, to reduce a junction temperature of a switching device still operating after the operation mode of the five-level inverter is switched from a five-level operation mode to a three-level operation mode, thereby preventing shutting down of the five-level inverter due to triggering of over-temperature protection for the switching device and prolonging service lives of the switching device. The method includes step 200 to step 205 hereinafter.

In step 200, a first three-level operation mode is determined as a three-level operation mode of the five-level inverter to be switched to from a five-level operation mode in a case that a PV input voltage is higher than a bridge line-line voltage command value of the five-level inverter required when the five-level inverter is connected to a power grid. The five-level inverter has two three-level operation modes.

In step 201, it is determined whether the operation mode of the five-level inverter is switched to the first three-level operation mode; and if the operation mode is switched to the first three-level operation mode, the method proceeds to step 202; otherwise, the method returns to step 201.

In step 202, it is determined whether a junction temperature of a switching device operating in the first three-level operation mode exceeds a first preset value; and if the junction temperature exceeds the first preset value, the method proceeds to step 203; otherwise, the method returns to step 202.

In step 203, the operation mode of the five-level inverter is switched from the first three-level operation mode to a second three-level operation mode.

In step 204, it is determined whether the junction temperature of a switching device operating in the second three-level operation mode exceeds a second preset value; and if the junction temperature exceeds the second preset value, the method proceeds to step 205; otherwise, the method returns to step 204.

In step 205, the operation mode of the five-level inverter is switched from the second three-level operation mode to the first three-level operation mode, and then the method returns to step 202.

Hereinafter the technical solution according to the embodiment is described in detail in conjunction with FIG. 1.

Figure 1:
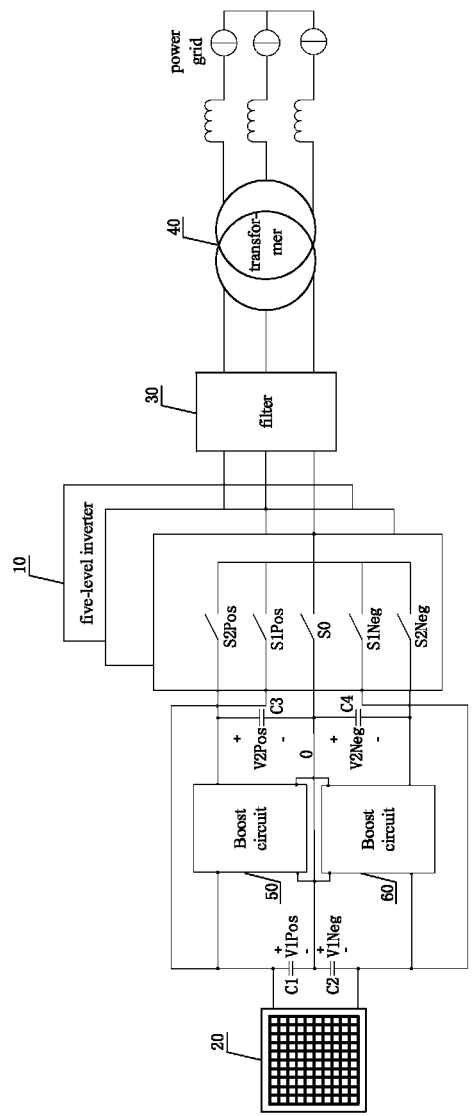
FIG. 1 is a schematic structural diagram of a photovoltaic system according to the conventional technology.

Referring to FIG. 1, in a normal case, a five-level inverter 10 operates in a five-level operation mode, i.e., the five-level inverter 10 alternately outputs five levels +1, −1, +2, −2 and 0 in different combinations of switching states of switching devices, and values of the five levels are respectively +V1Pos, −V1Neg, +V2Pos, −V2Neg and 0. Specifically, in a case that the switching device S1Pos connecting the positive PV input voltage of a photovoltaic array 20 to the grid side is switched on, +V1Pos (i.e, the level +1) is output; in a case that a switching device S1Neg connecting a negative PV input voltage of the photovoltaic array 20 with the grid side is switched on, −V1Neg (i.e, the level −1) is output; in a case that a switching device S0 connecting the middle point of the DC bus with the grid side is switched on, the level 0 is output; in a case that a switching device S2Pos connecting a first Boost circuit 50 with the grid side is switched on, +V2Pos (i.e, the level +2) is output; and in a case that a switching device S2Neg connecting a second Boost circuit 60 with the grid side is switched on, −V2Neg (i.e, the level −2) is output. In the following description of the embodiment, S2Pos indicates a first switching device, the level +2 is outputted when the first switching device is switched on; S2Neg indicates a second switching device, the level −2 is outputted when the second switching device is switched on; S0 indicates a third switching device, the level 0 is outputted when the third switching device is switched on; S1Pos indicates a fourth switching device, the level +1 is outputted when the fourth switching device is switched on; and S1Neg indicates a fifth switching device, the level −1 is outputted when the fifth switching device is switched on.

In a case that the PV input voltage is higher than a bridge line-line voltage command value of the five-level inverter 10 required when the five-level inverter 10 is connected to a power grid, the operation mode of the five-level inverter 10 is automatically switched from a five-level operation mode to a three-level operation mode. The five-level inverter 10 has two three-level operation modes: one three-level operation mode refers to an operation mode in which S1Pos and S1Neg are cut off and S0, S2Pos and S2Neg are controlled to operate alternatively; and another three-level operation mode refers to an operation mode in which S2Pos and S2Neg are cut off and S0, S1Pos and S1Neg are controlled to operate alternately.

Since a bus voltage of the five-level inverter 10 is too high and the output voltage level of the grid side inverter is reduced when the operation mode of the five-level inverter is switched to either of the two three-level operation modes, power loss of S1Pos, S1Neg and S0 (or S2Pos, S2Neg and S0) are increased significantly, and a junction temperature of S1Pos, S1Neg and S0 (or S2Pos, S2Neg and S0) is higher, over-temperature protection for the switching devices may be triggered and service lives of the switching devices are reduced greatly. In order to solve the above problem, in the embodiment, in a case that the PV input voltage of the five-level inverter 10 is higher than the bridge line-line voltage command value of the five-level inverter required when the five-level inverter is connected to the power grid, the operation mode of the five-level inverter 10 is controlled to be switched between the two three-level operation modes, thereby avoiding a higher junction temperature of S2Pos/S2Neg in a case that S2Pos/S2Neg operates for a long period of time in the three-level operation mode in which S0, S2Pos and S2Neg are controlled to operate alternatively or a higher junction temperature of S1Pos/S1Neg in a case that S1Pos/S1Neg operates for a long period of time in the three-level operation mode in which S0, S1Pos and S1Neg are controlled to operate alternately. Since the power loss is shared between S2Pos/S2Neg and S1Pos/S1Neg, a maximum junction temperature of S2Pos/S2Neg and S1Pos/S1Neg is reduced and service lives of S2Pos/S2Neg and S1Pos/S1Neg is prolonged.

For the three-level operation mode in which S1Pos, S1Neg and S0 operate alternately and the three-level operation mode in which S2Pos, S2Neg and S0 operate alternately, the latter operation mode is preferable since power loss of switching devices operating in the latter operation mode is lower. That is, a first three-level operation mode is defined as the mode in which S2Pos, S2Neg and S0 operate alternately, and a second three-level operation mode is defined as the mode in which S1Pos, S1Neg and S0 operate alternately.

Step 202 and step 204 indicate switching conditions to be met in a case that the operation mode of the five-level inverter is switched from one of the two three-level operation mode to the other of the two three-level operation mode. Specifically, 1) the junction temperature of the switching device operating in the first three-level operation mode exceeding the first preset value indicates that a current value of at least one of the following variants: the junction temperature of S2Pos or S2Neg, a substrate temperature of S2Pos or S2Neg, a radiator temperature of S2Pos or S2Neg, an $I^2t$ calculation value of S2Pos or S2Neg and an operation duration of S2Pos or S2Neg is greater than a threshold of the at least one of the variants; and 2) the junction temperature of the switching device operating in the second three-level operation mode exceeding the second preset value indicates that a current value of at least one of the following variants: the junction temperature of S1Pos or S1Neg, the substrate temperature of S1Pos or S1Neg, the radiator temperature of S1Pos or S1Neg, the $I^2t$ calculation value of S1Pos or S1Neg and the operation duration of S1Pos or S1Neg is greater than a threshold of the at least one of the variants.

$I^2t$, i.e., heat accumulation, indicates an integration of a square of a current per unit time and indicates heat quantity generated in a unit conductor physically.

It follows that, in the embodiment, in a case that the PV input voltage of the five-level inverter 10 is higher than the bridge line-line voltage command value of the five-level inverter required when the five-level inverter is connected to the power grid, the operation mode of the five-level inverter 10 is controlled to be switched between the two three-level operation modes, and the switching devices corresponding to the first operation mode and the switching devices corresponding to the second operation mode operate alternately, such that power loss is shared by two groups of switching devices, thereby reducing a maximum junction temperature of each group of switching devices, reducing a heat-dissipation cost of the switching devices, prolonging service lives of the switching devices and improving the operation reliability of the five-level inverter 10.

Figure 3:
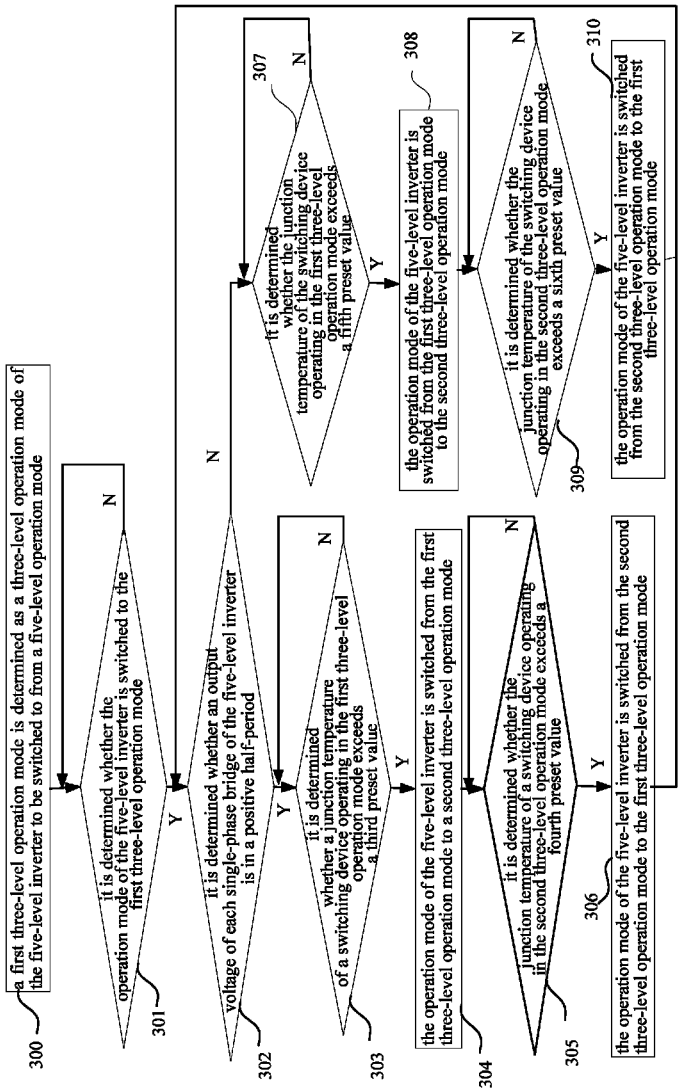
FIG. 3 is a flowchart of another method for switching an operation mode of a five-level inverter according to an embodiment of the present disclosure.

Referring to FIG. 3, another method for switching an operation mode of a five-level inverter is further disclosed according to an embodiment of the present disclosure, to reduce a junction temperature of a switching device still operating after the operation mode of the five-level inverter is switched from a five-level operation mode to a three-level operation mode. The method includes step 300 to step 310 hereinafter.

In step 300, a first three-level operation mode is determined as a three-level operation mode of the five-level inverter to be switched to from a five-level operation mode in a case that a PV input voltage is higher than a bridge line-line voltage command value of the five-level inverter required when the five-level inverter is connected to a power grid. The five-level inverter has two three-level operation modes.

In step 301, it is determined whether the operation mode of the five-level inverter is switched to the first three-level operation mode; and if the operation mode is switched to the first three-level operation mode, the method proceeds to step 302; otherwise, the method returns to step 301.

In step 302, it is determined whether an output voltage of each single-phase bridge of the five-level inverter is in a positive half-period; and if the output voltage is in the positive half-period, the method proceeds to step 303; otherwise, the method proceeds to step 307.

In step 303, it is determined whether a junction temperature of a switching device operating in the first three-level operation mode exceeds a third preset value; and if the junction temperature exceeds the third preset value, the method proceeds to step 304; otherwise, the method returns to step 303.

In step 304, the operation mode of the five-level inverter is switched from the first three-level operation mode to a second three-level operation mode.

In step 305, it is determined whether the junction temperature of a switching device operating in the second three-level operation mode exceeds a fourth preset value; and if the junction temperature exceeds the fourth preset value, the method proceeds to step 306; otherwise, the method returns to step 305.

In step 306, the operation mode of the five-level inverter is switched from the second three-level operation mode to the first three-level operation mode, and then the method returns to step 302.

In step 307, it is determined whether the junction temperature of the switching device operating in the first three-level operation mode exceeds a fifth preset value; and if the junction temperature exceeds the fifth preset value, the method proceeds to step 308; otherwise, the method returns to step 307.

In step 308, the operation mode of the five-level inverter is switched from the first three-level operation mode to the second three-level operation mode.

In step 309, it is determined whether the junction temperature of the switching device operating in the second three-level operation mode exceeds a sixth preset value; and if the junction temperature exceeds the sixth preset value, the method proceeds to step 310; otherwise, the method returns to step 309.

In step 310, the operation mode of the five-level inverter is switched from the second three-level operation mode to the first three-level operation mode, and then the method returns to step 302.

As compared with a three-level operation mode in which S1Pos, S1Neg and S0 operate alternatively, the junction temperature of a switching device operating in a three-level operation mode in which S2Pos, S2Neg and S0 operate alternatively is lower, hence the latter operation mode is selected as a first three-level operation mode. Step 302, step 303, step 305, step 307 and step 309 indicate switching conditions to be met in a case that the operation mode of the five-level inverter is switched from one of the two three-level operation mode to the other of the two three-level operation mode. Specifically, 1) the junction temperature of the switching device operating in the positive half-period of the output voltage of each single-phase bridge and in the first three-level operation mode exceeding the third preset value indicates that a current value of at least one of the following variants: the junction temperature of S2Pos, a substrate temperature of S2Pos, a radiator temperature of S2Pos, an $I^2t$ calculation value of S2Pos and an operation duration of S2Pos is greater than a threshold of the at least one of the variants;

2) the junction temperature of the switching device operating in the positive half-period of the output voltage of each single-phase bridge and in the second three-level operation mode exceeding the fourth preset value indicates that a current value of at least one of the following variants: the junction temperature of S2Neg, the substrate temperature of S2Neg, the radiator temperature of S2Neg, the $I^2t$ calculation value of S2Neg and the operation duration of S2Neg is greater than a threshold of the at least one of the variants;

3) the junction temperature of the switching device operating in the negative half-period of the output voltage of each single-phase bridge and in the first three-level operation mode exceeding the fifth preset value indicates that a current value of at least one of the following variants: the junction temperature of S1Pos, the substrate temperature of S1Pos, the radiator temperature of S1Pos, the $I^2t$ calculation value of S1Pos and the operation duration of S1Pos is greater than a threshold of the at least one of the variants; and 4) the junction temperature of the switching device operating in the negative half-period of the output voltage of each single-phase bridge and in the second three-level operation mode exceeding the sixth preset value indicates that a current value of at least one of the following variants: the junction temperature of S1Neg, the substrate temperature of S1Neg, the radiator temperature of S1Neg, the $I^2t$ calculation value of S1Neg and the operation duration of S1Neg is greater than a threshold of the at least one of the variants.

As compared with the above embodiment, in the embodiment, considering each half period of the output voltage of each-phase bridge the operation mode of the five-level inverter 10 is switched between the two three-level operation modes in the positive half-period or the negative half-period of the output voltage. In this case, the junction temperature of only one switching device needs to be considered in each time period, thereby facilitating calculation.

Figure 4:
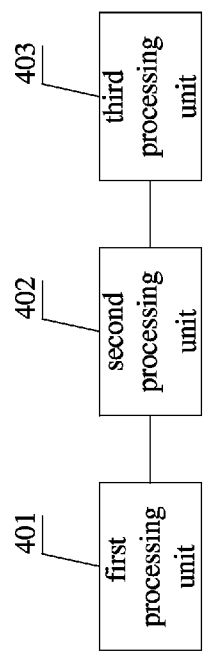
FIG. 4 is a schematic structural diagram of a device for switching an operation mode of a five-level inverter according to an embodiment of the present disclosure.

Referring to FIG. 4, a device for switching an operation mode of a five-level inverter is further disclosed according to an embodiment of the present disclosure, to reduce a junction temperature of a switching device still operating after the operation mode of the five-level inverter is switched from a five-level operation mode to a three-level operation mode. The device includes a first processing unit 401, a second processing unit 402 and a third processing unit 403.

The first processing unit 401 is configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid. The five-level inverter has two three-level operation modes.

The second processing unit 402 is configured to switch, after the operation mode of the five-level inverter is switched to the first three-level operation mode, the operation mode of the five-level inverter from the first three-level operation mode to a second three-level operation mode in a case that a junction temperature of a switching device operating in the first three-level operation mode exceeds a first preset value.

The third processing unit 403 is configured to switch the operation mode of the five-level inverter from the second three-level operation mode to the first three-level operation mode in a case that the junction temperature of a switching device operating in the second three-level operation mode exceeds a second preset value.

Preferably, the first three-level operation mode is defined as an operation mode in which S2Pos, S2Neg and S0 operate alternately, and the second three-level operation mode is defined as an operation mode in which S1Pos, S1Neg and S0 operate alternately.

Figure 5:
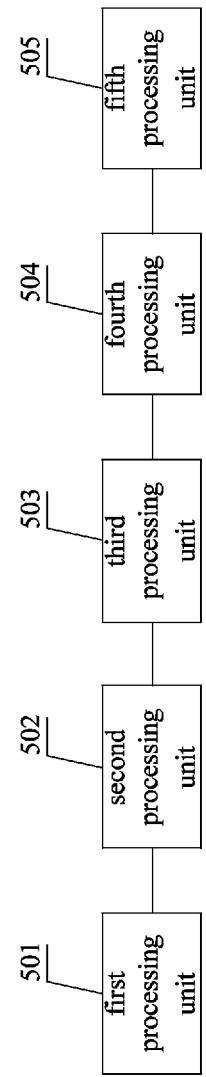
FIG. 5 is a schematic structural diagram of another device for switching an operation mode of a five-level inverter according to an embodiment of the present disclosure.

Referring to FIG. 5, another device for switching an operation mode of a five-level inverter is further disclosed according to an embodiment of the present disclosure. The device includes a first processing unit 501, a second processing unit 502, a third processing unit 503, a fourth processing unit 504 and a fifth processing unit 505.

The first processing unit 501 is configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid. The five-level inverter has two three-level operation modes.

The second processing unit 502 is configured to switch, after the operation mode of the five-level inverter is switched to the first three-level operation mode, the operation mode of the five-level inverter from the first three-level operation mode to a second three-level operation mode in a case that a junction temperature of a switching device operating in a positive half-period of an output voltage of each single-phase bridge and in the first three-level operation mode exceeds a third preset value.

The third processing unit 503 is configured to switch the operation mode of the five-level inverter from the second three-level operation mode to the first three-level operation mode in a case that the junction temperature of a switching device operating in the positive half-period of the output voltage of each single-phase bridge and in the second three-level operation mode exceeds a fourth preset value.

The fourth processing unit 504 is configured to switch the operation mode of the five-level inverter from the first three-level operation mode to a second three-level operation mode in a case that the junction temperature of a switching device operating in a negative half-period of the output voltage of each single-phase bridge and in the first three-level operation mode exceeds a fifth preset value.

And the fifth processing unit 505 is configured to switch the operation mode of the five-level inverter from the second three-level operation mode to the first three-level operation mode in a case that the junction temperature of a switching device operating in the negative half-period of the output voltage of each single-phase bridge and in the second three-level operation mode exceeds a sixth preset value.

Preferably, the first three-level operation mode is still defined as an operation mode in which S2Pos, S2Neg and S0 operate alternately, and the second three-level mode is defined as an operation mode in which S1Pos, S1Neg and S0 operate alternately.

In summary, in the present disclosure, in a case that the PV input voltage of the five-level inverter is higher than the bridge line-line voltage command value of the five-level inverter required when the five-level inverter is connected to the power grid, the operation mode of the five-level inverter is controlled to be switched between the two three-level operation modes, and the switching devices corresponding to the first operation mode and the switching devices corresponding to the second operation mode operate alternately, such that power loss is shared by two groups of switching devices, thereby reducing a maximum junction temperature of each group of switching devices, reducing a heat-dissipation cost of the switching devices, prolonging service lives of the switching devices and improving the operation reliability of the five-level inverter.

Various embodiments of the specification are described in a progressive way, each embodiment lays emphasis on the difference from other embodiments, and for the same or similar parts between various embodiments, one may refer to the description of other embodiments. For the devices provided according to the embodiments, since the devices corresponds to the method provided according to the embodiments, the description of the devices is simple, the related part may be referred to the description of the method embodiment.

According to the above illustration of the disclosed embodiments, those skilled in the art can implement or practice the present disclosure. Many changes to these embodiments are apparent for those skilled in the art, and general principles defined herein can be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A method for switching an operation mode of a five-level inverter, comprising:
    determining a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, wherein the five-level inverter has two three-level operation modes;

switching, after the operation mode of the five-level inverter is switched to the first three-level operation mode, the operation mode of the five-level inverter from the first three-level operation mode to a second three-level operation mode in a case that a junction temperature of a switching device operating in the first three-level operation mode exceeds a first preset value; and switching the operation mode of the five-level inverter from the second three-level operation mode to the first three-level operation mode in a case that the junction temperature of a switching device operating in the second three-level operation mode exceeds a second preset value.

2. The method according to claim 1, wherein the first three-level operation mode refers to an operation mode in which a first switching device, a second switching device and a third switching device operate alternately, and the second three-level operation mode refers to an operation mode in which a fourth switching device, a fifth switching device and the third switching device operate alternately; and the five-level inverter alternately outputs five levels +1, −1, +2, −2 and 0 in different combinations of switching states of the switching devices, wherein the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

3. The method according to claim 2, wherein the junction temperature of the switching device operating in the first three-level operation mode exceeding the first preset value indicates that a current value of at least one of the following variants: the junction temperature of the first switching device or the second switching device, a substrate temperature of the first switching device or the second switching device, a radiator temperature of the first switching device or the second switching device, an $I^2t$ calculation value of the first switching device or the second switching device and an operation duration of the first switching device or the second switching device is greater than a threshold of the at least one of the variants; and the junction temperature of the switching device operating in the second three-level operation mode exceeding the second preset value indicates that a current value of at least one of the following variants: the junction temperature of the fourth switching device or the fifth switching device, the substrate temperature of the fourth switching device or the fifth switching device, the radiator temperature of the fourth switching device or the fifth switching device, the $I^2t$ calculation value of the fourth switching device or the fifth switching device and the operation duration of the fourth switching device or the fifth switching device is greater than a threshold of the at least one of the variants.

4. A method for switching an operation mode of a five-level inverter, comprising:

determining a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, wherein the five-level inverter has two three-level operation modes;

switching, after the operation mode of the five-level inverter is switched to the first three-level operation mode, the operation mode of the five-level inverter from the first three-level operation mode to a second three-level operation mode in a case that a junction temperature of a switching device operating in a positive half-period of an output voltage of each single-phase bridge and in the first three-level operation mode exceeds a third preset value, and switching the operation mode of the five-level inverter from the second three-level operation mode to the first three-level operation mode in a case that the junction temperature of a switching device operating in the positive half-period of the output voltage of each single-phase bridge and in the second three-level operation mode exceeds a fourth preset value; and switching the operation mode of the five-level inverter from the first three-level operation mode to the second three-level operation mode in a case that the junction temperature of a switching device operating in a negative half-period of the output voltage of each single-phase bridge and in the first three-level operation mode exceeds a fifth preset value, and switching the operation mode of the five-level inverter from the second three-level operation mode to the first three-level operation mode in a case that the junction temperature of a switching device operating in the negative half-period of the output voltage of each single-phase bridge and in the second three-level operation mode exceeds a sixth preset value.

5. The method according to claim 4, wherein the first three-level operation mode refers to an operation mode in which a first switching device, a second switching device and a third switching device operate alternately, and the second three-level operation mode refers to an operation mode in which a fourth switching device, a fifth switching device and the third switching device operate alternately; and the five-level inverter alternately outputs five levels +1, −1, +2, −2 and 0 in different combinations of switching states of the switching devices, wherein the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

6. The method according to claim 5, wherein the junction temperature of the switching device operating in the positive half-period of the output voltage of each single-phase bridge and in the first three-level operation mode exceeding the third preset value indicates that a current value of at least one of the following variants: the junction temperature of the first switching device, a substrate temperature of the first switching device, a radiator temperature of the first switching device, an $I^2t$ calculation value of the first switching device and an operation duration of the first switching device is greater than a threshold of the at least one of the variants;

the junction temperature of the switching device operating in the positive half-period of the output voltage of each single-phase bridge and in the second three-level operation mode exceeding the fourth preset value indicates that a current value of at least one of the following variants: the junction temperature of the second switching device, the substrate temperature of the second switching device, the radiator temperature of the second switching device, the $I^2t$ calculation value of the second switching device and the operation duration of the second switching device is greater than a threshold of the at least one of the variants;

the junction temperature of the switching device operating in the negative half-period of the output voltage of each single-phase bridge and in the first three-level operation mode exceeding the fifth prevent value indicates that a current value of at least one of the following variants: the junction temperature of the fourth switching device, the substrate temperature of the fourth switching device, the radiator temperature of the fourth switching device, the $I^2t$ calculation value of the fourth switching device and the operation duration of the fourth switching device is greater than a threshold of the at least one of the variants; and the junction temperature of the switching device operating in the negative half-period of the output voltage of each single-phase bridge and in the second three-level operation mode exceeding the sixth preset value indicates that a current value of at least one of the following variants: the junction temperature of the fifth switching device, the substrate temperature of the fifth switching device, the radiator temperature of the fifth switching device, the $I^2t$ calculation value of the fifth switching device and the operation duration of the fifth switching device is greater than a threshold of the at least one of the variants.

7. A device for switching an operation mode of a five-level inverter, comprising:
a first processing unit configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, wherein the five-level inverter has two three-level operation modes;
a second processing unit configured to switch, after the operation mode of the five-level inverter is switched to the first three-level operation mode, the operation mode of the five-level inverter from the first three-level operation mode to a second three-level operation mode in a case that a junction temperature of a switching device operating in the first three-level operation mode exceeds a first preset value; and
a third processing unit configured to switch the operation mode of the five-level inverter from the second three-level operation mode to the first three-level operation mode in a case that the junction temperature of a switching device operating in the second three-level operation mode exceeds a second preset value.

8. The device according to claim 7, wherein the first three-level operation mode refers to an operation mode in which a first switching device, a second switching device and a third switching device operate alternately, and the second three-level operation mode refers to an operation mode in which a fourth switching device, a fifth switching device and the third switching device operate alternately; and the five-level inverter alternately outputs five levels +1, −1, +2, −2 and 0 in different combinations of switching states of the switching devices, wherein the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

9. A device for switching an operation mode of a five-level inverter, comprising:
a first processing unit configured to determine a first three-level operation mode as a three-level operation mode of the five-level inverter to be switched to from a five-level operation mode in a case that a PV input voltage is higher than a bridge line-line voltage command value of the five-level inverter required when the five-level inverter is connected to a power grid, wherein the five-level inverter has two three-level operation modes;
a second processing unit configured to switch, after the operation mode of the five-level inverter is switched to the first three-level operation mode, the operation mode of the five-level inverter from the first three-level operation mode to a second three-level operation mode in a case that a junction temperature of a switching device operating in a positive half-period of an output voltage of each single-phase bridge and in the first three-level operation mode exceeds a third preset value;
a third processing unit configured to switch the operation mode of the five-level inverter from the second three-level operation mode to the first three-level operation mode in a case that the junction temperature of a switching device operating in the positive half-period of the output voltage of each single-phase bridge and in the second three-level operation mode exceeds a fourth preset value;
a fourth processing unit configured to switch the operation mode of the five-level inverter from the first three-level operation mode to the second three-level operation mode in a case that the junction temperature of a switching device operating in a negative half-period of the output voltage of each single-phase bridge and in the first three-level operation mode exceeds a fifth preset value; and
a fifth processing unit configured to switch the operation mode of the five-level inverter from the second three-level operation mode to the first three-level operation mode in a case that the junction temperature of a switching device operating in the negative half-period of the output voltage of each single-phase bridge and in the second three-level operation mode exceeds a sixth preset value.

10. The device according to claim 9, wherein the first three-level operation mode refers to an operation mode in which a first switching device, a second switching device and a third switching device operate alternately, and the second three-level operation mode refers to an operation mode in which a fourth switching device, a fifth switching device and the third switching device operate alternately; and the five-level inverter alternately outputs five levels +1, −1, +2, −2 and 0 in different combinations of switching states of the switching devices, wherein the level +1 is outputted when the fourth switching device is switched on; the level −1 is outputted when the fifth switching device is switched on; the level +2 is outputted when the first switching device is switched on; the level −2 is outputted when the second switching device is switched on; and the level 0 is outputted when the third switching device is switched on.

* * * * *